US010260503B2

(12) United States Patent
Onara et al.

(10) Patent No.: US 10,260,503 B2
(45) Date of Patent: Apr. 16, 2019

(54) ELECTRIC COMPRESSOR

(71) Applicant: KABUSHIKI KAISHA TOYOTA JIDOSHOKKI, Kariya-shi, Aichi-ken (JP)

(72) Inventors: Kazuhiro Onara, Kariya (JP); Yumin Hishinuma, Kariya (JP); Hiroyuki Gennami, Kariya (JP); Muneharu Murase, Kariya (JP)

(73) Assignee: KABUSHIKI KAISHA TOYOTA JIDOSHOKKI, Kariya-shi, Aichi-ken (JP)

( * ) Notice: Subject to any disclaimer, the term of this patent is extended or adjusted under 35 U.S.C. 154(b) by 352 days.

(21) Appl. No.: 15/150,718

(22) Filed: May 10, 2016

(65) Prior Publication Data

US 2016/0333880 A1 Nov. 17, 2016

(30) Foreign Application Priority Data

May 12, 2015 (JP) ................................ 2015-097537

(51) Int. Cl.
*H02K 5/20* (2006.01)
*F04C 29/00* (2006.01)
(Continued)

(52) U.S. Cl.
CPC ...... *F04C 29/0085* (2013.01); *F04C 18/0215* (2013.01); *F04C 29/045* (2013.01);
(Continued)

(58) Field of Classification Search
CPC .......................... F04C 29/0085; F04C 29/045; F04C 18/0215; F04C 29/12; F04C 2240/40;
(Continued)

(56) References Cited

U.S. PATENT DOCUMENTS 6,234,768 B1 * 5/2001 Harakawa ............ B60H 1/3223 417/366
2004/0124731 A1 * 7/2004 Kimura ................ F04C 23/008 310/216.044

(Continued)

FOREIGN PATENT DOCUMENTS

JP 2005-201108 A 7/2005

*Primary Examiner* — Peter J Bertheaud
*Assistant Examiner* — Dnyanesh G Kasture
(74) *Attorney, Agent, or Firm* — Sughrue Mion, PLLC

(57) ABSTRACT

An electric compressor includes a rotary shaft, an electric motor, a compression mechanism, and a housing. The electric motor has a stator including a cylindrical stator core and a coil that has a coil end. The housing has a suction port and a main passage through which a fluid is flowed. An introduction hole through which the fluid is introduced into the compression mechanism is disposed opposite from the main passage. The housing has a coil end area in which a coil end of is disposed. The suction port and the introduction hole are connected via the main passage and the coil end area. The housing further has a groove including a first groove portion and a second groove portion having a depth greater than the first groove portion. A cross sectional are of a first passage portion is smaller than a cross sectional area of the main passage.

7 Claims, 3 Drawing Sheets

(51) Int. Cl.

| | |
|---|---|
| ***F04C 18/02*** | (2006.01) |
| ***F04C 29/12*** | (2006.01) |
| ***F04C 29/04*** | (2006.01) |
| ***H02K 5/124*** | (2006.01) |
| ***H02K 5/173*** | (2006.01) |
| ***H02K 7/10*** | (2006.01) |
| ***H02K 9/19*** | (2006.01) |

(52) U.S. Cl.
CPC ............. *F04C 29/12* (2013.01); *H02K 5/124* (2013.01); *H02K 5/1732* (2013.01); *H02K 5/20* (2013.01); *H02K 7/10* (2013.01); *H02K 9/19* (2013.01); *F04C 2240/30* (2013.01); *F04C 2240/40* (2013.01)

(58) Field of Classification Search
CPC ........ F04C 2240/30; H02K 5/20; H02K 7/10; H02K 5/1732; H02K 9/19; H02K 5/124; Y10T 29/49865; Y10T 29/49945
See application file for complete search history.

(56) References Cited

U.S. PATENT DOCUMENTS

2013/0177827 A1* 7/2013 Okabe ................ H01M 8/0258 429/434
2014/0003974 A1* 1/2014 Fukasaku ............ F04D 29/5806 417/370

* cited by examiner

10
R
Z
21B
64B
63C
101
91B
102
100
63
62
64
64A
A1
31
42(42A)
43
21(11)
21A
A2
21C
107
91
92A
94A
92
63A
81
14
92B
94B
93A
103
63B
93
80A
31A
93B
51
43A
41(41B)
13

ELECTRIC COMPRESSOR

BACKGROUND OF THE INVENTION

The present invention relates to an electric compressor.

Japanese Patent Application Publication No. 2005-201108 discloses an electric compressor including a rotary shaft, a compression mechanism that compresses a fluid with the rotation of the rotary shaft, an electric motor that drives the rotary shaft to rotate, and a housing that accommodates therein the rotary shaft, the compression mechanism and the electric motor. In the electric compressor of the above-cited Publication, the fluid drawn into the housing is used for cooling the electric motor.

The electric motor includes a stator core and a coil. For mounting the electric motor in the housing, the stator core of the electric motor may be fitted by a method such as shrink fitting. In this case, the stator core is subjected to stress from the housing. If the stress that is applied to the stator core is excessively large, it may cause troubles to the stator core such as deformation. However, it is undesirable to reduce the performance of the fluid to cool the electric motor at the sacrifice of relieving the stress.

The present invention, which has been made in light of the above described problem, is directed to providing an electric compressor that can relieve stress that is applied to the stator core while maintaining the performance to cool a coil of an electric motor.

SUMMARY OF THE INVENTION

In accordance with an aspect of the present invention, there is provided an electric compressor including a rotary shaft, and electric motor that drives to rotate the rotary shaft, a compression mechanism that compresses a fluid by the rotation of the rotary shaft, and a cylindrical housing that accommodates therein the rotary shaft, the compression mechanism, the electric motor. The electric motor has a stator including a cylindrical stator core fitted in the housing and a coil wound on the stator core, wherein the coil has a coil end. The housing has an inner peripheral surface that is in contact with an outer peripheral surface of the stator core and a suction port that is formed opposite from the compression mechanism with respect to the stator core and through which the fluid is introduced. A main passage is formed between the inner peripheral surface of the housing and the outer peripheral surface of the stator core so as to extend along an axial direction of the rotary shaft. The main passage is located on the same side as the suction port with respect to the rotary shaft and through which the fluid is flowed. An introduction hole is provided between the compression mechanism and the electric motor and through which the fluid is introduced into the compression mechanism, wherein the introduction hole is disposed opposite from the main passage with respect to the rotary shaft. The suction port and the introduction hole are connected to each other via the main passage and a coil end area in which the coil end is disposed, wherein the coil end area is provided between the stator core and the compression mechanism. The housing has a groove that is recessed from the inner peripheral surface of the housing and extends along the axial direction of the rotary shaft. The groove includes a first groove portion and a second groove portion that is in communication with the first groove portion and has a depth greater than the first groove portion, and the first groove portion is at least partially closed by the outer peripheral surface of the stator core to form a first passage portion. A cross sectional area of the first passage portion is smaller than a cross sectional area of the main passage.

Other aspects and advantages of the invention will become apparent from the following description, taken in conjunction with the accompanying drawings, illustrating by way of example the principles of the invention.

BRIEF DESCRIPTION OF THE DRAWINGS

The invention together with objects and advantages thereof, may best be understood by reference to the following description of the presently preferred embodiments together with the accompanying drawings in which.

DETAILED DESCRIPTION OF THE EMBODIMENTS

The following will describe an electric compressor according to an embodiment of the present invention. The electric compressor according to the present embodiment is of a type that is mounted to a vehicle for use in a vehicle air conditioner. In other words, the electric compressor of the embodiment is adapted to compress a refrigeration fluid.

Figure 1:
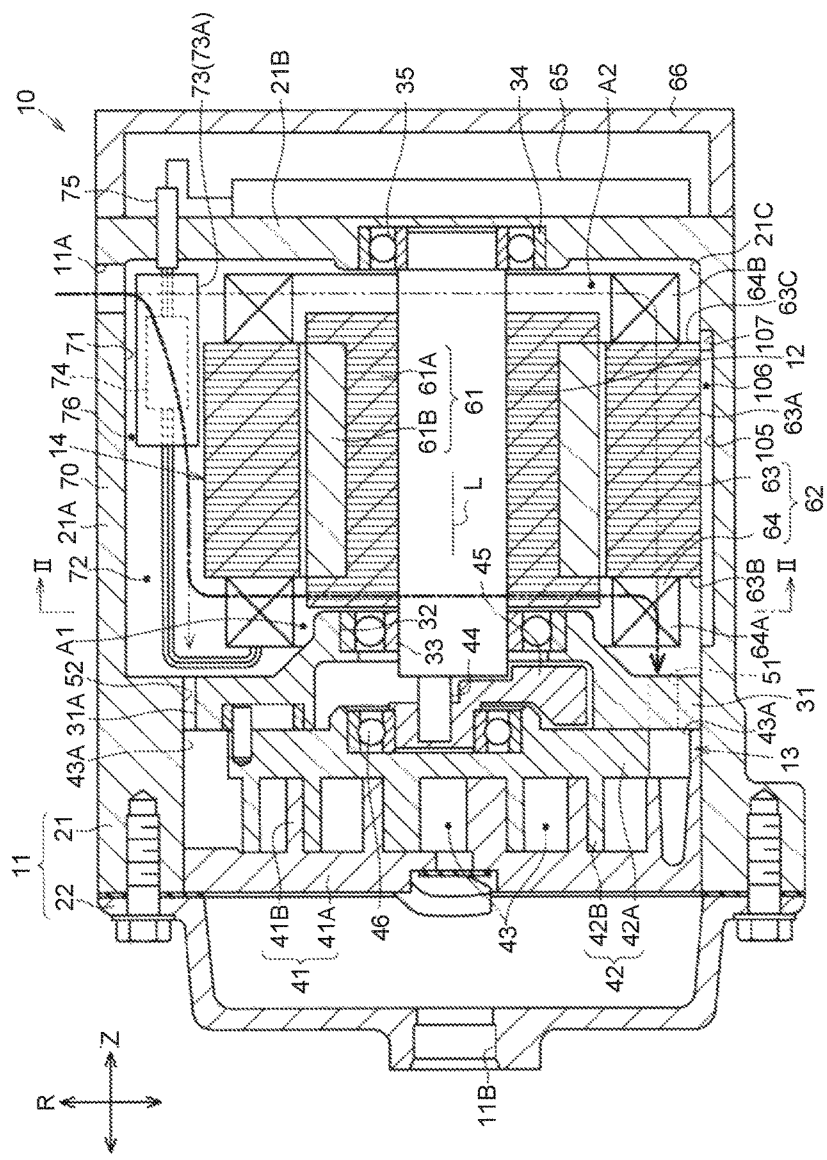
FIG. 1 is a schematic longitudinal sectional view of an electric compressor according to an embodiment of the present invention.

Referring to FIG. 1, there is shown an electric compressor 10 including a housing 11 that is formed with a suction port 11A through which a refrigerant gas is introduced from an external refrigeration circuit forming the vehicle air conditioner. The housing 11 accommodates therein a rotary shaft 12, a compression mechanism 13 and an electric motor 14.

The housing 11 has a generally cylindrical shape and is made of a thermally expandable material such as aluminum. The housing 11 includes a bottomed cylindrical suction housing 21 that is opened at one end thereof and is provided with the suction port 11A, and a bottomed cylindrical discharge housing 22 that is formed with a discharge port 11B through which refrigerant gas is discharged. The suction housing 21 and the discharge housing 22 are assembled in a manner in which the opened ends of the suction housing 21 and the discharge housing 22 are joined.

The suction port 11A is formed in a peripheral wall 21A of the suction housing 21 at a position that is closer to a bottom portion 21B than the opening of the suction housing 21. The discharge port 11B is connected to the external refrigeration circuit. For the convenience of the description, the side of the housing 11 on which the suction port 11A is formed will be referred to as the vertically upper side and the other side of the housing 11 as the lower side.

The rotary shaft 12 is rotatably supported in the housing 11A. A shaft support member 31 is disposed in the housing 11 and fixed to the housing 11 at a position between the compression mechanism 13 and the electric motor 14. The shaft support member 31 is disposed in facing relation to the bottom portion 21B of the suction housing 21 and in contact at the peripheral surface 31A thereof with an inner peripheral surface 21C of the suction housing 21.

The shaft support member 31 has therein a hole 32 in which one end of the rotary shaft 12 is inserted and rotatably supported by a first bearing 33 that is disposed between the inner surface of the hole 32 and the rotary shaft 12. In addition, the bottom portion 21B of the suction housing 21 has a recess 34 in which the other end of the rotary shaft 12 is inserted rotatably supported by a second bearing 35 that is disposed between the peripheral surface of the recess 34 and the rotary shaft 12. In other words, the rotary shaft 12 is supported rotatably at the opposite ends thereof by the first and second bearings 33, 35.

The compression mechanism 13 is arranged closer to the discharge port 11B than the suction port 11A in the housing 11. With the rotation of the rotary shaft 12, the compression mechanism 13 is operated to compress refrigerant gas that is introduced through the suction port 11A into the housing 11 and the compressed refrigerant gas is discharged though the discharge port 11B.

The compression mechanism 13 includes a fixed scroll 41 that is fixed to the housing 11 and a movable scroll 42 that makes an orbital movement relative to the fixed scroll 41. The fixed scroll 41 includes a disk-shaped base plate 41A having a disk shape, which is disposed coaxially with the axis L of the rotary shaft 12 and a scroll wall 41B that extends perpendicular to the base plate 41A. Similarly, the movable scroll 42 includes a base plate 42A that is disposed in facing relation to the base plate 41A of the fixed scroll 41 and a scroll wall 42B that extends perpendicularly to the base plate 42A toward base plate 41A of the fixed scroll 41.

The scroll wall 41B of the fixed scroll 41 and the scroll wall 42B of the movable scroll 42 are engaged with each other so as to form therebetween a compression chamber 43.

The movable scroll 42 makes an orbital movement with the rotation of the rotary shaft 12. Specifically, the one end of the rotary shaft 12 extends through the hole 32 of the shaft support member 31 toward the compression mechanism 13 and has an eccentric pin 44 extending from the end surface of the one end of the rotary shaft 12 at a position that is eccentric to the axis L of the rotary shaft 12. A bush 45 is mounted on the eccentric pin 44 and connected to the base plate 42A of the movable scroll 42 via a bearing 46.

As shown in FIG. 1, the electric compressor 10 has introduction holes 51, 52 through which refrigerant gas introduced through the suction port 11A is flowed into the compression chamber 43 of the compression mechanism 13. The introduction holes 51, 52 are provided by holes that are formed between the shaft support member 31 and the suction housing 21. Specifically, the suction housing 21 projects outwardly in radial direction R of the rotary shaft 12 at a position corresponding to the first introduction hole 51, and the first introduction hole 51 is defined between the inner surface of the projected portion of the suction housing 21 and the peripheral surface 31A of the shaft support member 31. The peripheral surface 31A of the shaft support member 31 is recessed at a position corresponding to the second introduction hole 52 thereby to form the second introduction hole 52. According to the present invention, however, the introduction holes 51, 52 may be formed by holes formed through the shaft support member 31.

The introduction holes 51, 52 are formed with different sizes. Specifically, the first introduction hole 51 is formed larger than the second introduction hole 52. In other words, the first introduction hole 51 is formed with a cross-sectional area that is larger than that of the second introduction hole 52 for a flow of fluid.

The first introduction hole 51 and the second introduction hole 52 are disposed opposite to each other with respect to the rotary shaft 12. Specifically, the second introduction hole 52 is disposed on the same upper side of the electric compressor 10 as the suction port 11A, and the first introduction hole 51 is disposed opposite from the suction port 11A, or on the lower side of the electric compressor 10. The introduction holes 51, 52 are in communication with an opening 43A of the compression chamber 43. The first introduction hole 51 corresponds to the introduction hole of the present invention.

In the electric compressor 10 of the above configuration, when the rotation of the rotary shaft 12 causes the movable scroll 42 to make orbital movement, the volume of the compression chamber 43 is decreased thereby to compress refrigerant gas introduced through the introduction holes 51, 52 into the compression chamber 43. The compressed refrigerant gas is discharged through the discharge port 11B.

The electric motor 14 is disposed in the housing 11 at a location that is closer to the suction port 11A than the compression mechanism 13 in the housing 11. The electric motor 14 drives the rotary shaft 12 to rotate thereby to cause the movable scroll 42 to make an orbital movement.

As shown in FIG. 1, the electric motor 14 includes a rotor 61 that rotates with the rotary shaft 12 and a stator 62 that is disposed around the rotor 61. The rotor 61 has a cylindrical shape and is fixed on the rotary shaft 12. The rotor 61 includes a cylindrical rotor core 61A that is formed by the lamination of a plurality of magnetic steel sheets in axial direction Z of the rotary shaft 12 and a permanent magnet 61B.

The stator 62 includes a cylindrical stator core 63 and a coil 64 that is wound on the stator core 63. The stator core 63 is formed by the lamination of a plurality of magnetic steel sheets in the axial direction Z of the rotary shaft 12. The rotor 61 and the stator core 63 are disposed at positions corresponding to each other in radial direction R of the rotary shaft 12, and the rotor 61 is disposed radially inward of the stator core 63. The rotor core 61A and the stator core 63 are arranged coaxially with the axis L of the rotary shaft 12.

Figure 2:
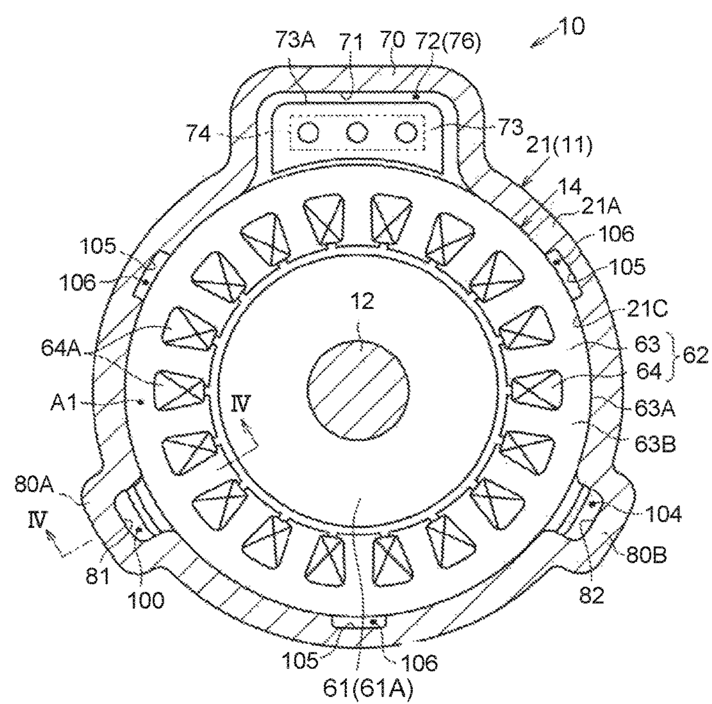
FIG. 2 is a cross sectional view of the electric compressor taken along line II-II of FIG. 1.

The stator core 63 is fitted to the housing 11. Referring to FIG. 2, the stator core 63 has an outer peripheral surface 63A that has a circular shape as seen in the axial direction Z of the rotary shaft 12 which in contact with the inner peripheral surface 21C of the suction housing 21 is in contact with the outer peripheral surface 63A of the stator core 63. The inner peripheral surface 21C has a generally circular shape as seen from the axial direction Z of the rotary shaft 12 except the projections 70, 80A, 81B, which will be described later. The stator core 63 is fixedly fitted to the suction housing 21 with the outer peripheral surface 63A of the stator core 63 in contact with the inner peripheral surface 21C of the suction housing 21.

The stator core 63 may be fixed to the suction housing 21 by shrink fitting. Specifically, the suction housing 21 is heated for thermal expansion and the suction housing 21 is then cooled with the stator core 63 is inserted in the suction housing 21. The stator core 63 is thus fixed to the suction housing 21.

The coil 64 is wound on a slot (not shown) that is formed in the stator core 63. The coil 64 has a pair of first and second coil ends 64A, 64B extending axially out from end surfaces 63B, 63C of the stator core 63, respectively, in axial direction thereof (axial direction Z of the rotary shaft 12). In other words, the first and second coil ends 64A, 64B are disposed on axially opposite sides of the stator core. As shown in FIG. 1, the first coil end 64A is disposed on the side of the stator core 63 that is adjacent to the compression mechanism 13 and the second coil end 64B is disposed on the opposite side.

The first coil end 64A is disposed in a first coil end area A1 between the first end surface 63B of the stator core 63 and the shaft support member 31. The first coil end area A1 is provided between the stator core 63 and the compression mechanism 13.

The second coil end 64B is disposed in a second coil end area A2 that is disposed opposite from the first coil end area A1 with respect to the stator core 63, or between the second end surface 63C and the inner surface of the bottom portion 21B of the suction housing 21.

The introduction holes 51, 52 are formed between the stator core 63 and the compression mechanism 13 and disposed close to the compression mechanism 13 than the stator core and connected to the first coil end area A1. Refrigerant gas in the first coil end area A1 is drawn into the compression chamber 43 via either one of the introduction holes 51, 52.

The suction port 11A is in communication with the second coil end area A2. The suction port 11A is formed in the peripheral wall 21A of the housing 11 at a location that is opposite from the compression mechanism 13 with respect to the stator core 63 and is opened toward the second coil end area A2 in the radial direction R of the rotary shaft 12. In other words, the suction port 11A is disposed adjacent to the second coil end 64B rather than the first coil end 64A.

As shown in FIG. 1, the electric compressor 10 is provided with an inverter 65 that drives the electric motor 14. The inverter 65 is disposed in a cylindrical cover 66 that is fixed to the bottom portion 21B of the suction housing 21 and electrically connected to the coil 64 and the inverter 65 are electrically connected.

The stator core 63 that is fitted to the housing 11 is subjected to the stress from the housing 11. Such stress tends to become large when the stator core 63 is fitted to the housing 11 by shrink fitting.

The electric compressor 10 of the present embodiment is configured to relieve the stress to the stator core 63 while the electric motor 14, more specifically the coil ends 64A, 64B of the electric motor 14, being cool. The following will describe such configuration of the electric compressor 10 and the electric connection between the coil 64 and the inverter 65.

Referring to FIGS. 1 and 2, the suction housing 21 has a projection 70. The projection 70 is formed closer to the suction port 11A than the rotary shaft 12. The projection 70 is positioned outward of the inner peripheral surface 21C of the suction housing 21 that is in contact with the stator core in radial direction R of the rotary shaft 12. The projection 70 extends along the axial direction Z of the rotary shaft 12. A main groove 71 that extends in the axial direction Z of the rotary shaft 12 is formed in the suction housing 21 by the formation of the projection 70. The main groove 71 and the outer peripheral surface 63A of the stator core 63 cooperate to form a main passage 72 through which refrigerant gas is flowed in the housing 11. As shown in FIG. 2, the part of the peripheral wall 21A of the suction housing 21 that corresponds to the projection 70 is formed projecting vertically upward.

As shown in FIG. 1, the main passage 72 is disposed closer to the suction port 11A than the rotary shaft 12 and opposite from the first introduction hole 51 with respect to the rotary shaft 12. The main passage 72 is opened at the opposite axial ends thereby to provide a fluid communication between the first coil end area A1 where the first coil end 64A is disposed and the second coil end area A2 where the second coil end 64B is disposed.

The suction port 11A is disposed closer to the bottom portion 21B of the suction housing than the main passage 72 and connected to the main passage 72. Thus, the suction port 11A and the first introduction hole 51 are connected to each other via the main passage 72 and the first coil end area A1.

A cluster block 73 is provided in the main passage 72 that electrically connects the coil 64 and the inverter 65. The cluster block 73 has a box shape and is made of an insulating material. The cluster block 73 has therein a connecting terminal 74 having one end thereof connected to the coil 64. The other end of the connecting terminal 74 is connected to one end of a hermetic terminal 75 that is disposed in the bottom portion 21B of the suction housing 21, and the other end of the hermetic terminal 75 is connected to the inverter 65. Accordingly, the coil 64 and the inverter 65 are electrically connected via the connecting terminal 74 and the hermetic terminal 75. The cluster block 73 is disposed outward of the stator core 63 in the radial direction R of the rotary shaft 12.

As shown in FIG. 2, the cluster block 73 is formed smaller than the main passage 72, or main groove 71, in the cross-sectional dimension as seen in the axial direction Z of the rotary shaft 12, so that a clearance 76 is formed between an outer peripheral surface 73A of the cluster block 73 and the outer peripheral surface 63A of the stator core 63 and between the inner surface of the main groove 71 and the outer peripheral surface 63A of the stator core 63. Therefore, the refrigerant gas flows through the clearance 76 at a position where the cluster block 73 is disposed in the main passage 72. Thus, the minimum cross sectional area of the main passage 72 corresponds to the cross sectional area of the clearance 76.

The projection 70 extends axially from the bottom portion 21B of the suction housing 21 to a position beyond the first end surface 63B of the stator core 63. Thus, part of the projection 70 extends to the area corresponding to the second coil end 64B. The suction port 11A is formed through the peripheral wall 21A of the suction housing 21 where the projection 70 is formed at a position in which the second coil end 64B is disposed. Additionally, the cluster block 73 is positioned in the area between the suction port 11A and the second coil end 64B and also in the main passage 72.

As shown in FIG. 2, the suction housing 21 further has a first projection 80A and a second projection 80B that are positioned outward of the inner peripheral surface 21C of the suction housing 21 that is in contact with the stator core 63 in radial direction R of the rotary shaft 12 and extend axially parallel to the projection 70 in the axial direction Z of the rotary shaft 12. The projections 80A and 80B are formed in a substantially identical shape and positioned so that the projections 70, 80A and 80B are angularly spaced from one another at a predetermined angle. Specifically, the projections 70, 80A, 80B are spaced angularly at an angle of about 120 degrees.

Figure 4:
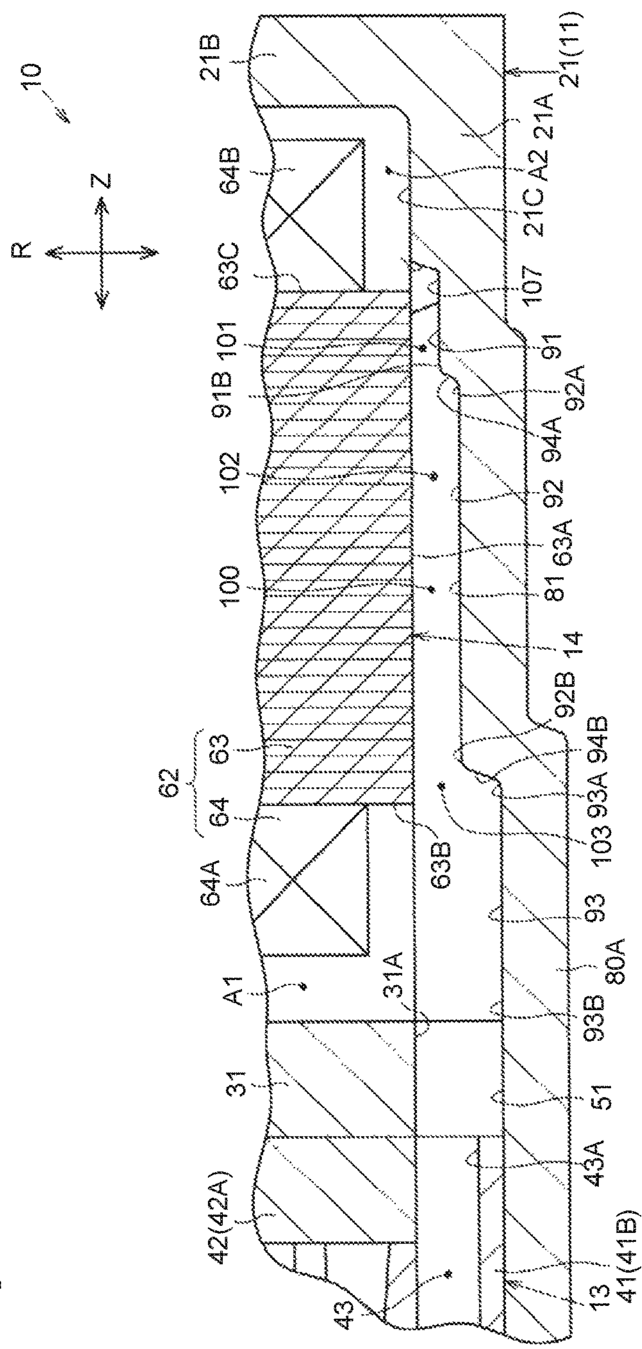
FIG. 4 is a cross-sectional view of the taken along line IV-IV of FIG. 2.

Referring to FIG. 4, the first projection 80A projects from the suction housing 21 in stepped manner (two steps in the present embodiment) so that the portion of the first projection 80A facing the compression mechanism 13 is positioned outer than the portion of the first projection 80A facing the outer peripheral surface 63A of the stator core 63 in the radial direction R of the rotary shaft 12.

As shown in FIG. 2, the suction housing 21 has a first groove 81 and a second groove 82 that are recessed from the inner peripheral surface 21C of the suction housing 21 and mostly formed by the first and second projections 80A, 80B, respectively. The first and second grooves 81, 82 extend along the axial direction Z of the rotary shaft 12.

As shown in FIG. 4, the depth of the first groove 81 is varied because of the stepped configuration of the first projection 80A. Specifically, the first groove 81 includes a first groove portion 91 that faces the outer peripheral surface 63A of the stator core 63 adjacently to the second end surface 63C thereof and a second groove portion 92 that is in communication with the first groove portion 91 and has a depth greater than the first groove portion 91. The first groove portion 91 of the first groove 81 is disposed on the side of the stator 62 that is adjacent to the bottom portion 21B of the suction housing 21, or to the second coil end 64B, and the second groove portion 92 of the first groove 81 is disposed on the side adjacent to the compression mechanism 13, or to the first coil end 64A. In other words, the second groove portion 92 is disposed closer to the compression mechanism 13 than the first groove portion 91.

The first groove portion 91 has a first end 91A that is located between the bottom portion 21B of the suction housing 21 and the second end surface 63C of the stator core 63 in the axial direction Z of the rotary shaft 12 and a second end 91B that is connected to a first end 92A of the second groove portion 92 by a first stepped portion 94A. In other words, the first groove portion 91 and second groove portion 92 are formed continuously in this order from the bottom portion 21B of the suction housing 21 toward the compression mechanism 13 in the axial direction Z of the rotary shaft 12. The first stepped portion 94A is located closer to the second end surface 63C of the stator core 63 than the first end surface 63B.

The first groove portion 91 of the first groove extends across the second end surface 63C of the stator core 63 in the axial direction Z of the rotary shaft 12 so that part of the second coil end 64B and of the outer peripheral surface 63A of the stator core 63 faces the first groove portion 91. The second groove portion 92 is disposed extending in facing relation to part of the outer peripheral surface 63A of the stator core 63 in the radial direction R of the rotary shaft 12. The second groove portion 92 has an axial dimension that is greater than that of the first groove portion 91.

The first groove 81 further includes a third groove portion 93 having a depth greater than the second groove portion 91. The third groove portion 93 is disposed opposite from the first groove portion 91 with the second groove portion 92 positioned therebetween and in the vicinity of the compression mechanism 13. The third groove portion 93 has a first end 93A that is connected to a second end 92B of the second groove portion 92 via a second stepped portion 94B. Thus, the first groove portion 91, the second groove portion 92 and the third groove portion 93 are formed in this order in the axial direction Z of the rotary shaft 12 from the side of the bottom portion 21B toward the compression mechanism. The second stepped portion 94B is disposed closer to the bottom portion 21B than the first end surface 63B of the stator core in the axial direction Z of the rotary shaft.

The third groove portion 93 of the first groove 81 extends so as to face part of the outer peripheral surface 63A and the first coil end 64A. The second end 93B of the third groove portion 93 is connected to the first introduction hole 51. In other words, the first groove 81 corresponds to the first introduction hole 51 in the axial direction Z of the rotary shaft 12.

The first end 91A of the first groove portion 91 that forms one end of the first groove 81 in extending direction thereof is positioned between the bottom portion 21B of the suction housing 21 and the second end surface 63C of the stator core 63, and the second end 93B of the third groove portion 93 that forms the other end of the first groove 81 is positioned between the compression mechanism 13 and the first end surface 63B of the stator core 63. Specifically, the first groove 81 is formed along the outer peripheral surface 63A of the stator core 63 with the opposite ends of the first groove 81 positioned beyond in the extending direction thereof projects out from the end surfaces 63B, 63C of the stator core 63, respectively. In other words, the first groove 81 is disposed so as to connect the first coil end area A1 and the second coil end area A2.

As shown in FIG. 4, the bottom surface of the first groove 81 is separated away from the outer peripheral surface 63A of the stator core 63 in stepped manner, so that the distance from the bottom surface of the first groove 81 to the outer peripheral surface 63A of the stator core 63 as measured in the radial direction R of the rotary shaft 12 in the second groove portion 92 is greater than that in the first groove portion 91, and the distance from the bottom surface of the first groove 81 to the outer peripheral surface 63A of the stator core 63 in third groove portion 93 is greater than that in the second groove portion 92. Thus, the bottom surface of the third groove portion 93 of the first groove 81 is formed continuous with the inner surface of a part of the suction housing 21 that projects and forms the first introduction hole 51.

Figure 3:
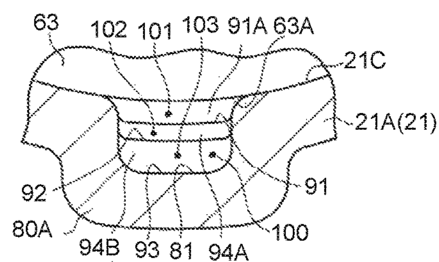
FIG. 3 is a partially enlarged view of the FIG. 2, showing a first groove.

As shown in FIG. 3, the widths of the first, second and third groove portions 91, 92, 93 of the first groove 81, or the dimension of the respective groove portions as measured in the circumferential direction of the suction housing 21, are substantially the same. According to the present invention, however, the widths of the first, second and third groove portions 91, 92, 93 need not be the same, but may be formed so as to increase or decrease toward the compression mechanism 13. Alternatively, the width of any one of the groove portions 91, 92, 93 may different from those of the other groove portions. It is noted that the "depth" of the groove portions 91, 92, 93 represents the dimension of the first, second and third groove portions 91, 92, 93 as measured from the outer peripheral surface 63A of the stator core 63 to the bottom surfaces of the respective groove portions.

As shown in FIG. 4, a first sub-passage 100 through which a refrigerant gas is flowed is formed in the housing 11 by the first groove 81 and the outer peripheral surface 63A of the stator core 63. In other words, the first groove 81 is closed by the outer peripheral surface of the stator core 63 to form the first sub-passage 100. The first sub-passage 100 provides a fluid communication between the first coil end area A1 and the second coil end area A2.

The cross sectional area of the first sub-passage 100 is varied by its axial position because the first groove 81 is formed by the first and second and third groove portions 91, 92, 93 having different depths. Specifically, the first sub-passage 100 includes a first passage portion 101 that is formed by the first groove portion 91 of the first groove 81 and the outer peripheral surface 63A of the stator core 63 and a second passage portion 102 that is formed by the second groove portion 92 of the first groove 81 and the outer peripheral surface 63A of the stator core 63 and is larger than the first passage portion 101. The first sub-passage 100 further includes a third passage portion 103 that is formed by the third groove portion 93 of the first groove 81 and the outer peripheral surface 63A of the stator core 63 and is larger than the second passage portion 102. Thus, the cross sectional area of the first passage portion 101 is smaller than that of the second passage portion 102 and the cross sectional area of the second passage portion 102 of the first sub-passage 100 is smaller that of the third passage portion 103. Thus, the first passage portion 101 has the smallest cross sectional area in the first sub-passage 100 for the flow of the refrigerant.

According to the present embodiment, the second passage portion 102 of the first sub-passage 100 extends toward the first introduction hole 51 in axial direction Z of the rotary shaft 12 and the third passage portion 103 of the first sub-passage 100 is in communication with the first introduction hole 51. The third passage portion 103 of the first sub-passage 100 is formed by the third groove portion 93 of the first groove 81 that is formed facing the outer peripheral surface 63A and the first coil end 64A.

As shown in FIGS. 2 and 3, the cross sectional area of the first sub-passage 100 is smaller than that of the main passage 72. The first passage portion 101 having the smallest cross sectional area in the first sub-passage 100 is still smaller than the clearance 76 of the main passage 72 in cross sectional area. In addition, the cross sectional area of the second passage portion 102 of the first sub-passage 100 is smaller than that of the clearance 76.

Furthermore, the second groove 82 that is formed by the second projection 80B and the outer peripheral surface 63A of the stator core 63 cooperate to form a second sub-passage 104, as shown in FIG. 2. The second sub-passage 104 is formed in substantially identical shape to the first sub-passage 100 except its angular position, that is, the second sub-passage 104 is disposed at a position that is spaced angularly by 120 degrees from the first sub-passage 100.

As shown in FIGS. 1 and 2, a plurality of supplementary grooves 105 (three in the present embodiment) is formed in the suction housing of the housing 11, in addition to the main groove 71 and the first and second grooves 81, 82. The supplementary grooves 105 are disposed at an equidistant angular spacing so that each supplementary groove 105 is positioned between any two adjacent grooves so as not to interfere with the main groove 71 and the grooves 81, 82, as shown in FIG. 2. Specifically, the supplementary grooves 105 are formed at a regular interval of 120 degrees.

As shown in FIG. 1, the supplementary groove 105 extends in the axial direction Z of the rotary shaft 12 and has an axial dimension that is greater than that of the stator core 63. The opposite ends of the supplementary groove 105 extend beyond the end surfaces 63B, 63C of the stator core 63, respectively. In other words, the supplementary groove 105 is disposed extending between the first coil end area A1 and the second coil end area A2. The three supplementary grooves 105 have the same depth throughout their axial length.

The supplementary groove 105 and the outer peripheral surface 63A of the stator core 63 cooperate to form a supplementary passage 106 through which a refrigerant gas is flowed in the suction housing 21. The supplementary passage 106 provides a fluid communication between the first coil end area A1 and the second coil end area A2. The supplementary passage 106 has a fixed cross sectional area irrespective to its axial position thereof, which is smaller than the minimum cross sectional area of the main passage 72. Specifically, the cross sectional area of the supplementary passage 106 is set smaller than the cross sectional area of the first passage portion 101 of the first sub-passage 100 in the present embodiment.

In the electric compressor 10 of the present embodiment, the minimum cross sectional area of the main passage 72 is greater than the total of the minimum cross sectional areas of the sub-passages 100, 104 and the supplementary passages 106.

The suction housing 21 has in the inner peripheral surface 21C thereof a ring groove 107 formed extending in the circumferential direction of the suction housing 21 and in communication with one longitudinal end of the first groove 81, or with the first end 1A of the first groove portion 91 of the first groove. The ring groove 107 is formed at a position facing the edge between the outer peripheral surface 63A and the first end surface 63B of the stator core 63 in radial direction R of the rotary shaft 12. The ring groove 107 serves as a clearance that prevents the interference between the edge of the stator core 63 and the suction housing 21, which in turn prevents the magnetic steel sheets from being separated by any contact between the edge and the suction housing 21.

The following describes the operation of the electric compressor of the above-described embodiment.

The stress applied to the stator core 63 due to the fitting of the stator core 63 to the housing 11 is relieved by the main groove 71, the first and second grooves 81, 82, and the supplementary grooves 105. Specifically, the stress applied to the stator core 63 is relieved by deformation of the walls of the housing 11 that form the main groove 71, the first and second grooves 81, 82 and the supplementary grooves 105. Because of the provision of the grooves, 81, 82 and the supplementary groove 105, the housing 11 has therein the sub-passages 100, 104 and the supplementary passage 106 as well as the main passage 72.

Refrigerant gas introduced through the suction port 11A is flowed through the second coil end area A2 and the main passage 72 toward the first coin end area A1. Then, the refrigerant gas in the first coil end area A1 is drawn into the compression chamber 43 of the compression mechanism 13 via one of the first and second introduction holes 51, 52. Because the first introduction hole 51 is larger than the second introduction hole 52, the refrigerant gas flowed through the main passage 72 is preferentially guided into the first introduction hole 51 that is positioned opposite from the main passage 72 with respect to the rotary shaft 12 rather than into the second introduction hole 52.

Part of the refrigerant gas flowed into the second coil end area A2 is flowed through the first and second sub-passages 100, 104 and the supplementary passage 106 into the first coil end area A1, which is then introduced into the compression chamber 43 via one of the introduction holes 51, 52. Since the cross sectional area of the first and second sub-passages 100, 104 and the supplementary passage 106 are smaller than the main passage 72, the flow rate of the refrigerant gas flowing through the sub-passage 100, 104 and the supplementary passage 106 is smaller than that through the main passage 72.

The electric compressor 10 of the present embodiment offers the following effects.

(1) The electric compressor 10 includes the rotary shaft 12, the compression mechanism 13 that compresses refrigerant gas by the rotation of the rotary shaft 12, the electric motor 14 that drives the rotary shaft 12 to rotate, and the housing 11 that accommodates therein the rotary shaft 12, the compression mechanism 13 and the electric motor 14. The electric motor 14 includes the stator 62 that has the cylindrical stator core 63 fitted to the housing 11, and the coil 64 wound on the stator core 63. The suction housing 21 of the housing 11 has the inner peripheral surface 21C that is in contact with the outer peripheral surface 63A of the stator core 63 and the suction port 11A that is disposed opposite from the compression mechanism 13 with respect to the stator core 63.

The housing 11 has the main passage 72 through which refrigerant gas is flowed, and the main passage 72 that extends in the axial direction Z of the rotary shaft 12 is disposed closer to the suction port 11A than the rotary shaft 12 in the housing 11. The shaft support member 31 of the electric compressor 10 has the first introduction hole 51 that introduces refrigerant gas that is introduced from the suction port 11A into the compression mechanism 13 (more specifically, compression chamber 43). The first introduction hole 51 is disposed closer to the compression mechanism 13 than the stator core 63 and on the side opposite from the main passage 72 with respect to the rotary shaft 12. The suction port 11A and the first introduction hole 51 are connected to each other through the main passage 72 and also the first coil end area A1 that is located on the side of the stator core 63 that is adjacent to the compression mechanism 13 between the first end surface 63B of the stator core 63 and the shaft support member 31 and where the first coil end 64A is disposed. Thus, refrigerant gas introduced through the suction port 11A into the housing 11 is flowed through the main passage 72 and the first coil end area A1 toward the first introduction hole 51. Because the first introduction hole 51 and the main passage 72 are disposed radially opposite to each other in the suction housing 21, the flow path of the refrigerant gas is made long, with the result that the first coil end 64A may be cooled effectively. Accordingly, the coil 64 of the electric motor 14 in the housing 11 may be cooled effectively by using the refrigerant gas.

The housing 11 further has the first groove 81 that is recessed from the inner peripheral surface 21C kept in contact with the outer peripheral surface 63A of the stator core 63 and extends in the axial direction Z of the rotary shaft 12. The first groove 81 has the first groove portion 91 that is located radially facing the outer peripheral surface 63A of the stator core 63 in the radial direction R of the rotary shaft, and the second groove portion 92 that is recessed further than and in communication with the first groove portion 91. The cross sectional area of the first sub-passage 100 that is formed by the first groove portion 91 and the outer peripheral surface 63A of the stator core 63 is smaller than that of the main passage 72.

In the electric compressor 10 having such configuration, the formation of the first groove 81 helps to relieve the stress applied from the housing 11 to the stator core 63, which may protect the stator core 63 against the deformation caused by the stress applied to the stator core 63 from the housing 11 when the stator core 63 is fitted to the housing 11.

From the viewpoint of stress relief, the first groove 81 should preferably be recessed deeper. If the first groove 81 is recessed deeper, however, the cross sectional area of the first sub-passage 100 formed by the first groove 81 and the outer peripheral surface 63A of the stator core 63 becomes larger, which causes the refrigerant gas to be guided and flowed preferentially through the first sub-passage 100 rather than the main passage 72. This may reduce the flow of the refrigerant gas in the main passage 72 thereby to prevent the efficient cooling of the first coil end 64A, with the result that the cooling of the coil 64 may be decreased.

According to the present embodiment, on the other hand, the first groove 81 is formed including the first groove portion 91 and the second groove portion 92 having different depths, so that the flow rate of the refrigerant gas flowing through the first groove 81 is regulated by the first groove portion 91 of the first groove 81. Because the first passage portion 101 of the first sub-passage 100 that is formed by the first groove portion 91 of the first groove 81 and the outer peripheral surface 63A of the stator core 63 has the cross sectional area that is smaller than that of the main passage 72, the refrigerant gas is more likely to flow through the main passage 72. This prevents the reduction of the effect of cooling the coil 64 caused by the reduced refrigeration gas flow in the main passage 72. In addition, the formation of the second groove portion 92 that is recessed deeper than the first groove portion 91 may help to relieve effectively the stress applied from the housing 11 to the stator core 63. As a result, the electric compressor 10 of the present embodiment maintains efficient cooling of the coil 64, while relieving the stress to the stator core 63.

(2) The second groove portion 92 of the first groove 81 is positioned closer to the compression mechanism 13 than the first groove portion 91, and the second passage portion 102 of the first sub-passage 100 that is formed by the second groove portion 92 of the first groove 81 and the outer peripheral surface 63A of the stator core 63 extends toward the first introduction hole 51. Thus, the refrigerant gas flowing through the first sub-passage 100 is smoothly drawn into the first introduction hole 51. Therefore, the refrigerant gas flowing through the main passage 72 and the first coil end area A1 is not be hampered by the refrigerant gas flowing through the first sub-passage 100, with the result that the refrigerant gas is stably supplied to the first introduction hole 51.

(3) The stator core 63 has at the opposite ends thereof a pair of the coil ends 64A, 64B of the coil 64. The suction port 11A and the first introduction hole 51 are connected to each other via the main passage 72 and the first coil end area A1 that is positioned in the vicinity of the compression mechanism 13 and where the first coil end 64A is disposed. The suction port 11A is located adjacent to the second coil end area A2 where the second coil end 64B is disposed. Thus, the refrigerant gas drawn in through the suction port 11A is divided to flow through the first and second coil end areas A1, A2, so that the first and second coil ends 64A, 64B are cooled effectively.

(4) The first sub-passage 100 that is formed by the first groove 81 and the outer peripheral surface 63A of the stator core 63 provides a fluid communication between the first and second coil end areas A1, A2. The refrigerant gas in the second coil end area A2 passes through the first sub-passage 100 and the first coil end area A1 and drawn into the first introduction hole 51, which allows the refrigerant gas in the second coil end area A2 to flow toward the first coil end area A1 without stagnating in the second coil end area A2.

If the refrigerant gas drawn through the suction port 11A is turned into a liquid by any reason, the refrigerant liquid may stagnate in the second coil end area A2, which may cause the second coil end 64B to be soaked in the refrigerant liquid and the insulation of the coil 64 may be decreased, accordingly. According to electric compressor 10 of the present embodiment, such trouble may be prevented because the refrigerant liquid may be flowed through the first sub-passage 100 and discharged through the first introduction hole 51.

(5) The electric compressor 10 has the second introduction hole 52 that is disposed radially opposite from the first introduction hole 51 with respect to the rotary shaft 12 and introduces the refrigerant gas into the compression mechanism 13, and the first introduction hole 51 is formed larger than the second introduction hole 52. The formation of the second introduction hole 52 allows the refrigerant gas drawn in through the suction port 11A to be guided to the compression mechanism 13 easily. Because the first introduction hole 51 is larger than the second introduction hole 52, the refrigerant gas is preferentially flowed to the first introduction hole 51. Therefore, the formation of the second introduction hole 52 does not prevent the cooling of the first coil end 64A.

(6) The housing 11 has the supplementary groove 105 that forms the supplementary passage 106 having a fixed cross sectional area that is smaller than that of the main passage 72, which helps to further relieve the stress applied to the stator core 63.

Part of the suction housing 21 is projected in the radial direction R of the rotary shaft 12 so as to form the first and second grooves 81, 82 having depths that are varied by their axial positions. This may cause the suction housing 21 to become large in size. However, the supplementary passage 106 having the fixed depth and the cross sectional area smaller than the main passage 72 may be formed by forming a recess, instead of a projection, in the inner peripheral surface 21C in the suction housing 21. The combination of the first and second grooves 81, 82 and the supplementary groove 105 fulfill the requirement of relieving the stress of the stator core 63 and preventing the housing 11 from becoming large.

The present invention may be modified in various manners, as exemplified below.

Although two grooves 81, 82 are formed in the housing 11 in the present embodiment, three or more grooves such as 81, 82 may be formed. Either one of the grooves 81, 82 may be omitted.

The supplementary grooves 105 need not necessarily be formed.

In the first groove 81, the third groove portion 93 may be omitted and the second groove portion 92 may be extended to the first introduction hole 51. Alternatively, the second groove portion 92 may be omitted and either one of the first groove portion 91 and the third groove portion 93 may be extended. In this case, the third groove portion 93 corresponds to the second groove portion of the present invention.

Alternatively, the first groove portion 91 may be omitted and the second groove portion 92 may be extended. In this case, the second groove portion 92 and the third groove portion 93 correspond to first groove portion and the second groove portion of the present invention, respectively.

The second stepped portion 94B may be formed at a position that is closer to the compression mechanism 13 than the first end surface 63B of the stator core 63. In this case, the third passage portion 103 of the first sub-passage 100 is omitted.

The second introduction hole 52 need not necessarily be formed.

The stator core 63 need not necessarily be fitted to the housing 11 by the shrink fitting but may be fitted by any other means.

Although the cluster block 73 is provided in the main passage 72 in the embodiment of the present invention, the cluster block 73 may be arranged in any suitable position. Alternatively, the cluster block 73 need not necessarily be formed. In other words, the electric connection between the electric motor 14 and the inverter 65 may be made suitably.

The main passage 72 may be formed by a groove formed in the stator core 63. In this case, the size of the housing 11 may be reduced.

The projections 80A, 80B need not necessarily be formed in the suction housing 21. Instead, the first and second grooves 81, 82 may be formed by changing the thickness of the peripheral wall 21A of the suction housing 21.

The cross sectional area of the main passage 72 need not necessarily be varied along the axial direction of the suction housing 21. In other words, the main passage may have a fixed cross sectional area along its entire axial length.

The first groove 81 need not necessarily provide a fluid communication between the coil end areas A1, A2. For example, the first groove 81 may be formed with one end thereof disposed at a position facing the outer peripheral surface 63A of the stator core 63.

The first introduction hole 51 and the main passage 72 may be spaced at positions 180 degree from each other in circumferential direction of the housing 11. In other words, the first introduction hole 51 and the main passage 72 may be disposed suitably as long as they are disposed on radially opposite sides from each other. More specifically, the first introduction hole 51 and the main passage 72 may be arranged so that an interior angle between an imaginary line extending in the radial direction R of the rotary shaft 12 between the first introduction hole 51 and the axis L of the rotary shaft 12 and another imaginary line extending in the radial direction R of the rotary shaft 12 between the main passage 72 and the axis L of the rotary shaft 12 is at 90 degree or larger.

The present invention is applicable to any type of compression mechanism.

The electric compressor 10 of the present invention may be mounted to any machine other than vehicle.

The electric compressor 10 may be used for any devices other than the vehicle air conditioner. For example, if the electric compressor 10 is mounted on a fuel cell vehicle in which a fuel cell battery is mounted on the vehicle, the electric compressor 10 may be used as air supply device that supplies air to the fuel cell battery. In other words, the electric compressor may be used to compress any fluid such as refrigerant and air.

What is claimed is:

1. An electric compressor comprising:

a rotary shaft;

an electric motor driving to rotate the rotary shaft;

a compression mechanism compressing a fluid by the rotation of the rotary shaft; and a cylindrical housing accommodating the rotary shaft, the compression mechanism, the electric motor, wherein the electric motor has a stator including a cylindrical stator core fitted in the housing and a coil wound on the stator core, wherein the coil has a coil end, wherein the housing has an inner peripheral surface that is in contact with an outer peripheral surface of the stator core and a suction port through which the fluid is introduced into the housing, wherein a main passage is formed between the inner peripheral surface of the housing and the outer peripheral surface of the stator core so as to extend along an axial direction of the rotary shaft, a cluster block is disposed in the main passage, wherein the main passage is configured to guide the fluid from the suction port toward the compression mechanism, the main passage is formed by a main groove formed in the inner peripheral surface of the housing that extends in the axial direction of the rotary shaft and the outer peripheral surface of the stator core, a smallest cross sectional area of the main passage corresponds to a cross sectional area of a clearance formed between an outer peripheral surface of the cluster block, an inner surface of the main groove, and the outer peripheral surface of the stator core, and wherein an introduction hole is provided between the compression mechanism and the electric motor and through which the fluid is introduced into the compression mechanism, wherein the suction port and the introduction hole are connected to each other via the main passage and a coil end area in which the coil end is disposed, wherein the coil end area is provided between the stator core and the compression mechanism, wherein the housing has a sub-groove that is recessed from the inner peripheral surface of the housing and extends along the axial direction of the rotary shaft, the sub-groove is formed independently of the main groove, wherein the sub-groove includes a first groove portion and a second groove portion that is in communication with the first groove portion and has a depth greater than the first groove portion, wherein a sub-passage is formed by the sub-groove and the outer peripheral surface of the stator core and has a first passage portion formed by the first groove portion and the outer peripheral surface of the stator core, wherein a cross sectional area of the first passage portion corresponds to a smallest cross sectional area of the sub-passage, and wherein the smallest cross sectional area in the sub-passage is smaller than the smallest cross sectional area in the main passage.

2. The electric compressor according to claim 1, wherein the second groove portion is disposed closer to the compression mechanism than the first groove portion, and wherein the second groove portion is at least partially closed by the outer peripheral surface of the stator core to form a second passage portion extending toward the introduction hole.

3. The electric compressor according to claim 1, wherein the coil end is a first coil end, wherein the coil has a second coil end in addition to the first coil end, wherein the first coil end and the second coil end are disposed on axially opposite sides of the stator core, wherein the first coil end is closer to the compression mechanism than the second coil end, wherein the second coil end is closer to the suction port than the first coil end, wherein the coil end area is a first coil end area in which the first coil end is disposed, wherein a second coil end area is an area in which the second coil end is disposed.

4. The electric compressor according to the claim 3, wherein the sub-passage provides a fluid communication between the first coil end area and the second coil end area.

5. The electric compressor according to claim 1, wherein the introduction hole is a first introduction hole, wherein the electric compressor further has a second introduction hole and the rotary shaft is disposed between the first introduction hole and the second introduction hole when the electric compressor is viewed in cross section, wherein the fluid is introduced into the compression mechanism through the second introduction hole, and wherein the first introduction hole is larger than the second introduction hole.

6. The electric compressor according to claim 1, wherein the housing has a supplementary groove that is partially closed by the outer peripheral surface of the stator core to form a supplementary passage having a fixed cross sectional area that is smaller than the cross sectional area of the main passage.

7. The electric compressor according to claim 1, wherein the cluster block is disposed in the main passage at a position that faces the suction port.

* * * * *